United States Patent [19]

Moser

[11] Patent Number: 5,174,433
[45] Date of Patent: Dec. 29, 1992

[54] SELF-CLEANING EN-MASSE CONVEYOR

[75] Inventor: Robert H. Moser, Omaha, Nebr.

[73] Assignee: InterSystems, Inc., Omaha, Nebr.

[21] Appl. No.: 886,756

[22] Filed: May 21, 1992

[51] Int. Cl.$^5$ .............................................. B65G 19/06
[52] U.S. Cl. .................. 198/734; 198/735.3; 198/860.3
[58] Field of Search ................. 198/716, 735.3, 735.4, 198/735.5, 734, 860.3, 860.5, 860.1

[56] References Cited

U.S. PATENT DOCUMENTS

| | | | |
|---|---|---|---|
| 1,744,933 | 1/1930 | Thoen | 198/716 |
| 2,559,614 | 7/1951 | Hapman | 198/716 X |
| 4,023,673 | 5/1977 | Hansen | 198/735.4 |
| 4,186,832 | 2/1980 | Kelley | 198/735.3 X |
| 4,241,823 | 12/1980 | Clewett | 198/735.5 X |
| 4,890,723 | 1/1990 | Debuisson et al. | 198/734 X |
| 5,048,671 | 9/1991 | Ellsworth | 198/716 X |

FOREIGN PATENT DOCUMENTS

| | | | |
|---|---|---|---|
| 652559 | 11/1962 | Canada | 198/716 |
| 623679 | 12/1935 | Fed. Rep. of Germany | 198/716 |
| 950309 | 2/1964 | United Kingdom | 198/734 |

OTHER PUBLICATIONS

Brochure—The Essmueller Company, "Peerless Drag-Flite Conveyors" (no date given).
Brochure—InterSystems, "En Masse Conveyors" Feb. 1989.
Brochure—Screw Conveyor Corporation, "Super-Flo Conveyor for Dependable Service" (no date given).

*Primary Examiner*—D. Glenn Dayoan
*Attorney, Agent, or Firm*—Zarley, McKee, Thomte, Voorhees & Seas

[57] ABSTRACT

A self-cleaning en-masse conveyor comprising an elongated conveyor housing having a removable bottom panel which defines an arc of approximately 90°. Vertically disposed wall sections extend upwardly from the upper edges of the bottom panel and have a lid or cover extending across the upper ends thereof. A conveyor chain is mounted in the conveyor and includes a plurality of flat flights positioned thereon which have a rounded edge which conforms in shape to the cross-section of the bottom panel.

12 Claims, 8 Drawing Sheets

SELF-CLEANING EN-MASSE CONVEYOR

BACKGROUND OF THE INVENTION

This invention relates to a conveyor and more particularly to a self-cleaning en-masse conveyor for conveying bulk materials.

There have been previously provided many types of conveyors for conveying a wide variety of bulk materials. One type of such conveyor is the en-masse drag-flight conveyor manufactured by The Essmueller Company of St. Louis, Mo. and by InterSystems, Inc. of Omaha, Nebr. En-masse drag-flight conveyors normally include small rectangular chain flights which move along the bottom of a conveyor housing to convey the material. Another type of conveyor is the round bottom or U-shaped bottom conveyors having semi-circular chain flights employed therein.

The prior art conveyors suffer from certain disadvantages. One disadvantage of the prior art conveyors is that the bottom of the conveyor housing wears and must be frequently replaced. In the U-shaped conveyors, such replacement is extremely costly since the bottom forms a large portion of the conveyor housing itself. In an effort to overcome the bottom replacement problem, liners are frequently positioned in the bottoms of the housings but the liners are quite expensive and must also be frequently replaced. Further, the liners can trap material causing contamination.

Yet another disadvantage of the prior art conveyor described hereinabove is that they may not generally be inclined more than 20°.

A further disadvantage of the prior art conveyors is that they are too large in relation to the amount of material conveyed and thereby their use is limited in tight spaces. Further, the self-cleaning intermediate gates of the prior art conveyors are not practical and are not truly self-cleaning. Additionally, the prior art conveyors normally experience a problem of the chain flights occasionally "riding-up" onto the conveyor side wall.

It is therefore a principal object of the invention to provide a self-cleaning conveyor which is capable of large capacities in a small space such as en-masse conveyors.

Still another object of the invention is to provide a self-cleaning, tall flight conveyor capable of inclines up to 60°.

Yet another object of invention is to provide a conveyor of the type described wherein the lining of the conveyor section is accomplished by means of a removable bottom panel.

Yet another object of the invention is to provide a conveyor wherein the removable bottom panel may be easily replaced and cleaned.

Yet another object of the invention is to provide a conveyor having a removable bottom panel which may have various thicknesses without requiring a change in the chain flight size.

Still another object of the invention is to provide a conveyor wherein the intermediate discharge gates are truly self-cleaning to maintain product integrity.

Yet another object of the invention is to provide a conveyor wherein the flights cannot "ride-up" onto the side wall of the conveyor housing.

Still another object of the invention is to provide a conveyor of the type described which is economical of manufacture, durable in use and refined in appearance.

These and other objects of the present invention will be apparent to those skilled in the art.

SUMMARY OF THE INVENTION

A self-cleaning en-masse conveyor is described which incorporates the high capacity of the en-masse type conveyor with the clean out capabilities of a round bottom type conveyor. The conveyor of this invention is built much like an en-masse conveyor with the exception of the bottom panel and chain flights. The bottom panel of the conveyor is a partial arc covering approximately 90° verses the 180° arc of the typical round bottom design. The design of the bottom of the conveyor permits the material to slide into the center of the conveyor and therefore achieve self-cleaning while yet permitting the capacity and lining advantages described above. The partial arc design described above permits a "curved slide" type discharge gate to be designed yielding an uninterrupted bottom surface for total clean out.

In particular, the conveyor includes an elongated conveyor housing having a head end and a tail end with the housing comprising an elongated bottom panel having a rounded transverse cross-section which is substantially less than a semi-circle, namely 90° although 120° is possible. Side walls are secured to flanges on the upper edges of the bottom panel and extend substantially vertically upwardly therefrom. A cover for the lid extends between the upper ends of the side walls.

A movable chain means is mounted in the conveyor and includes a plurality of spaced apart, flat chain flights mounted thereon. Each of the chain flights has a rounded bottom edge which is complementary in shape to the bottom of the conveyor housing. Each of the chain flights also has opposite side edges which extend vertically upwardly from the opposite ends of the bottom edge thereof, and a top edge which extends between the upper ends of the side edges. The side edges of each of the chain flights are positioned closely adjacent to the lower portion of the side walls of the conveyor housing when in their conveying attitude. The height of the side edges of the chain flights are substantially less than the height of the side walls of the conveyor housing.

DESCRIPTION OF THE PREFERRED EMBODIMENT

One form of the self-cleaning en-masse conveyor of this invention is shown in FIGS. 1-6 and is referred to generally by the reference numeral 10 and would include a plurality of housing sections 12, 12', etc. joined together in an end to end relationship to provide a conveyor housing 14 having a head end 16 and a take up or tail end 18. Inlet 20 is provided at the tail end 18 in conventional fashion. Spaced along the length of the conveyor would be a plurality of intermediate gate sections if so desired. A conventional tail shaft 21 is provided in the tail end of the housing and has the conveyor chain means 22 mounted thereon. Head shaft 24 is provided at the head end of the conveyor and would have the conveyor chain means 22 operatively mounted thereon by means of movable sprockets. For purposes of description, conveyors chain means 22 will be described as having a return portion 26 and a conveying portion 28.

Figures 1, 2:
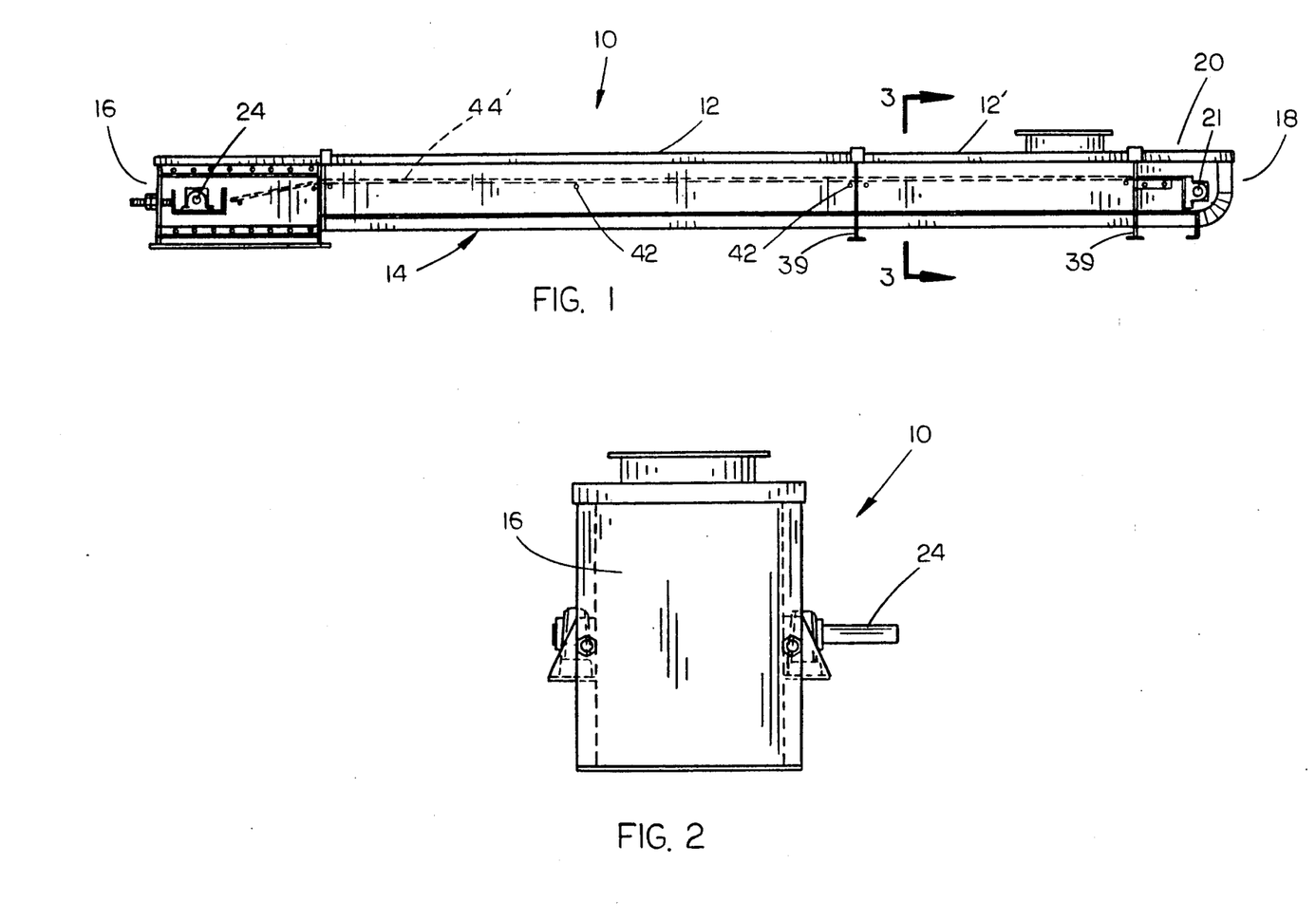
FIG. 1 is a side elevational view of the conveyor of this invention.
FIG. 2 is an end view of the conveyor as seen from the left side of FIG. 1.
Figure 3:
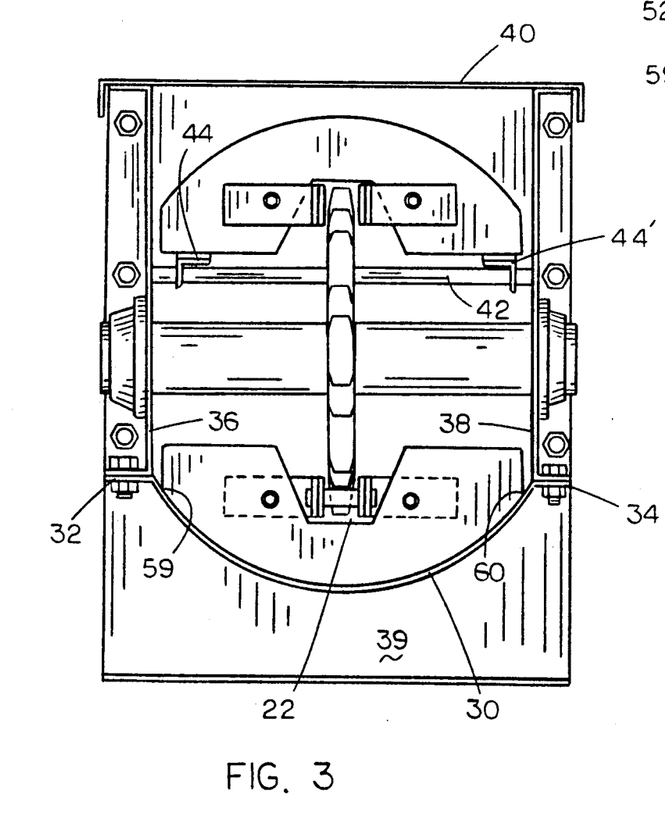
FIG. 3 is an enlarged sectional view seen on lines 3—3 of FIG. 2.
Figure 7:
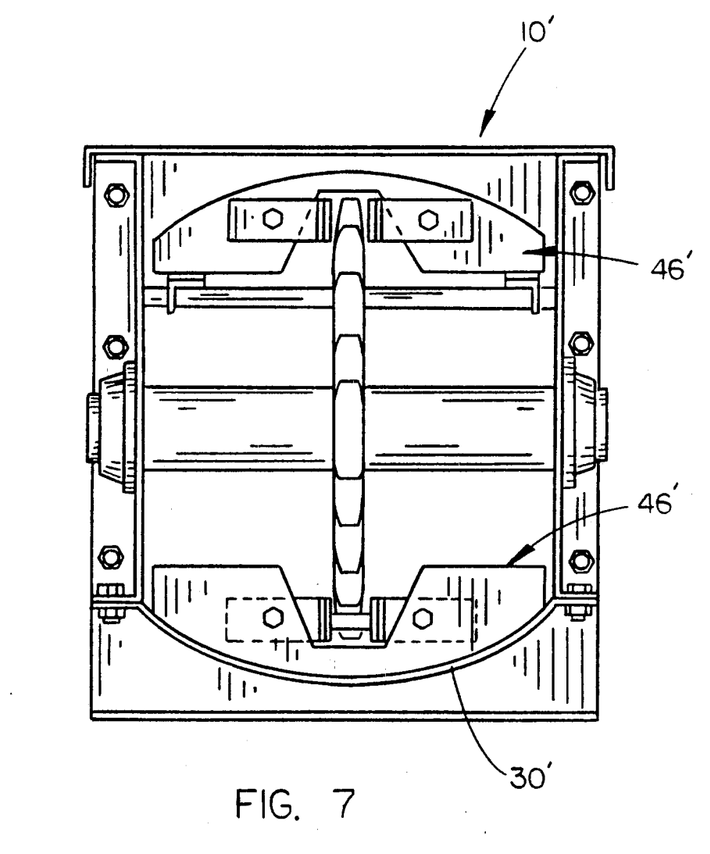
FIG. 7 is an enlarged sectional view similar to FIG. 3 except that a modified form of the conveyor is illustrated.
Figure 8:
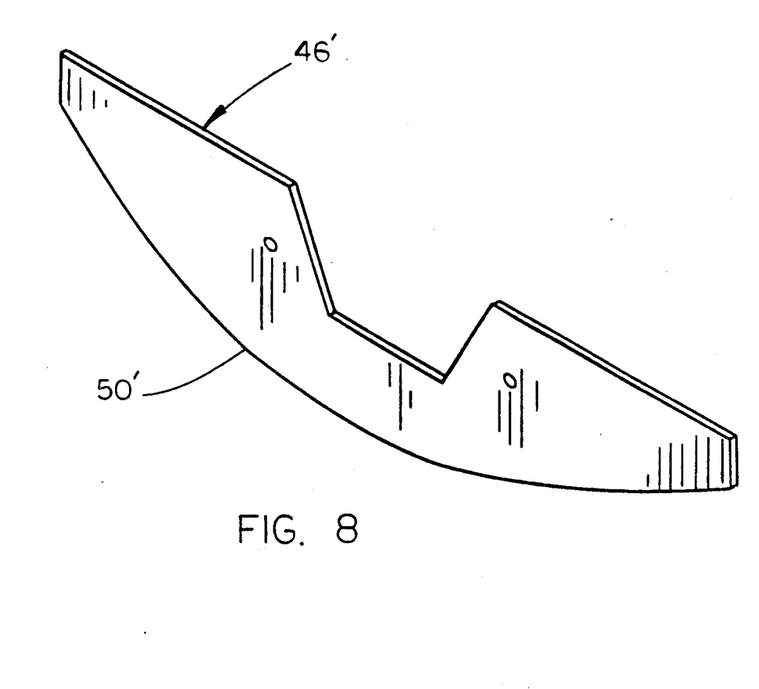
FIG. 8 is a perspective view of one of the chain flights of the embodiment of FIG. 7.

Each of the housing sections 12, and 12' is comprised of a bottom panel 30 having horizontally disposed flanges 32 and 34 provided at the upper edges thereof which extend horizontally outwardly therefrom. Bottom panel 30 is a rounded transverse cross-section which is substantially less than a semi-circle. The arc of bottom panel 30, when viewed in cross-section, is approximately 120°, although the arc may be as little as 70°. However, the preferred arc is 90° as seen in FIG. 7 and 8 which is the preferred embodiment of the invention as will be discussed in more detail hereinafter.

Each of the housing sections also includes a pair of side walls 36 and 38 which are secured to the flanges 32 and 34 respectively by bolts 33 and which extend upwardly therefrom as best seen in FIG. 3. Although the drawings illustrate that the bottom panel 30 is bolted to the lower ends of the side walls 36 and 38, the panel 30 could be hinged thereto, if so desired, to facilitate cleaning of the interior of the conveyor. The ends of the conveyor sections are provided with feet or legs 39.

A lid or cover 40 extends across the upper ends of the side walls 36 and 38 to enclose the interior of the conveyor. A plurality of shafts 42 extend between the side walls 36 and 38 along the length thereof and have return rails 44 and 44' mounted thereon to prevent the return portion of the conveyor chain means from drooping or sagging.

Figure 4:
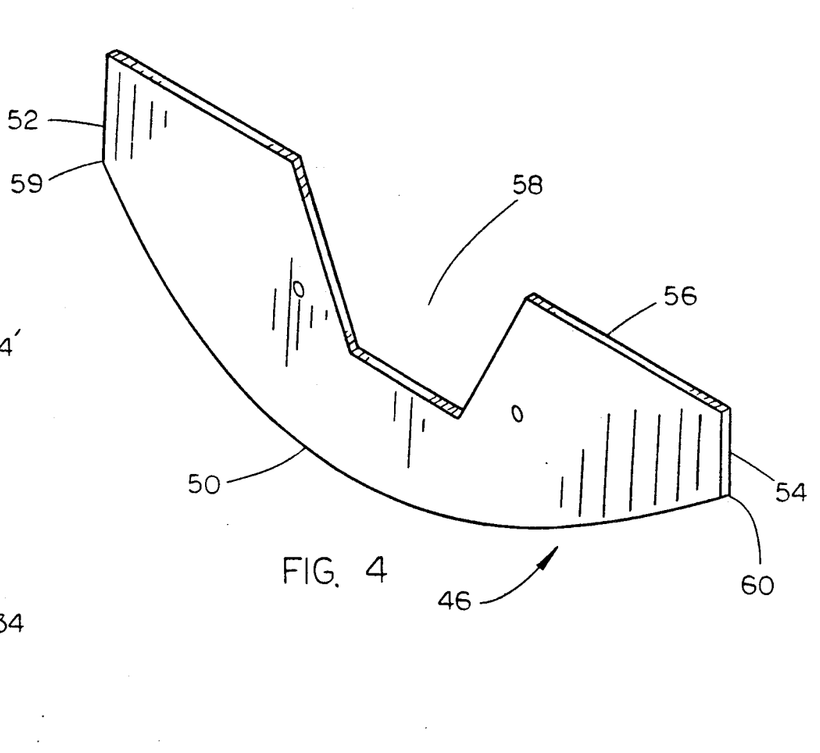
FIG. 4 is a perspective view of one of the chain flights.
Figure 5:
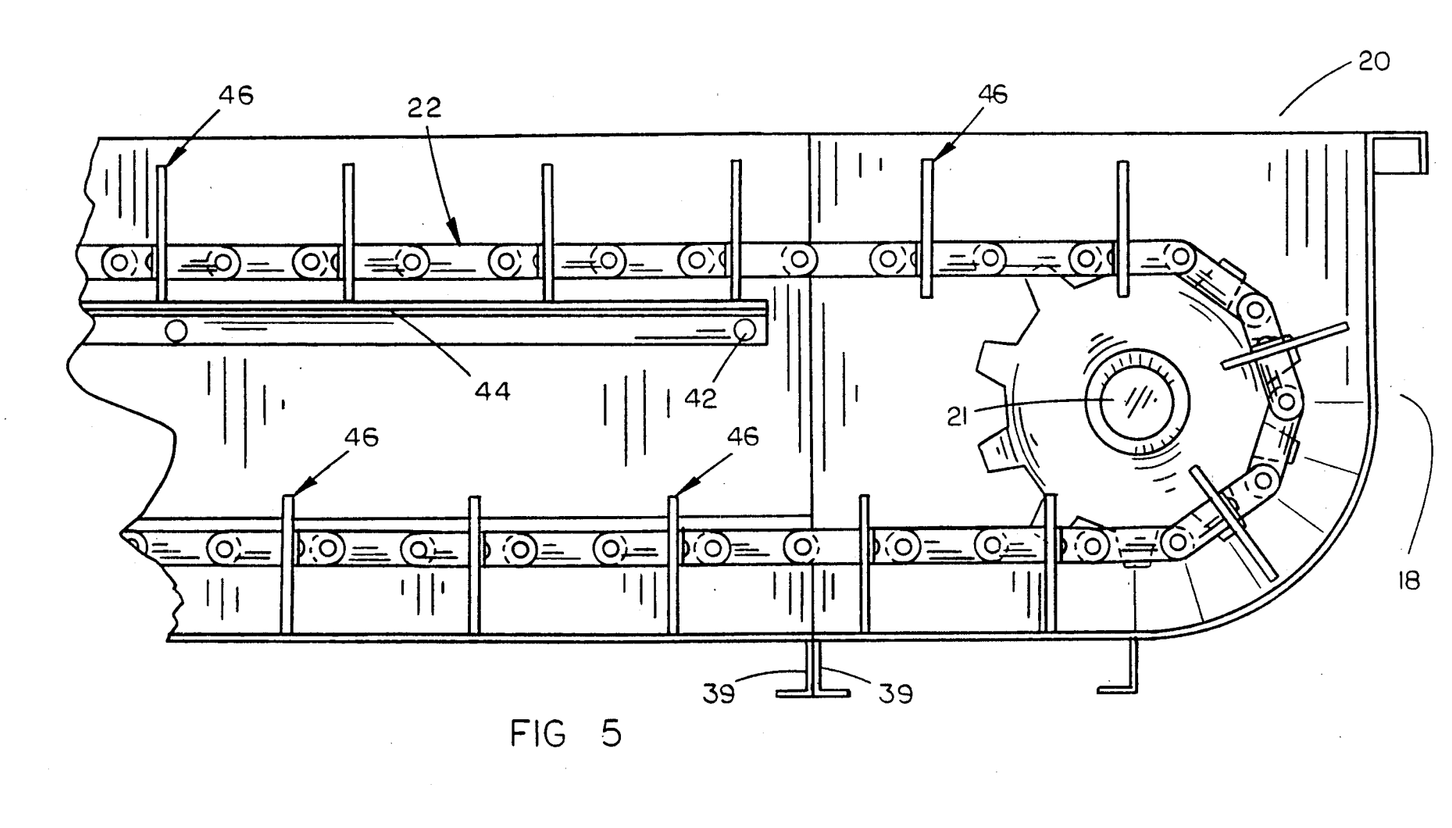
FIG. 5 is a partial sectional view of the tail end of the conveyor.
Figure 6:
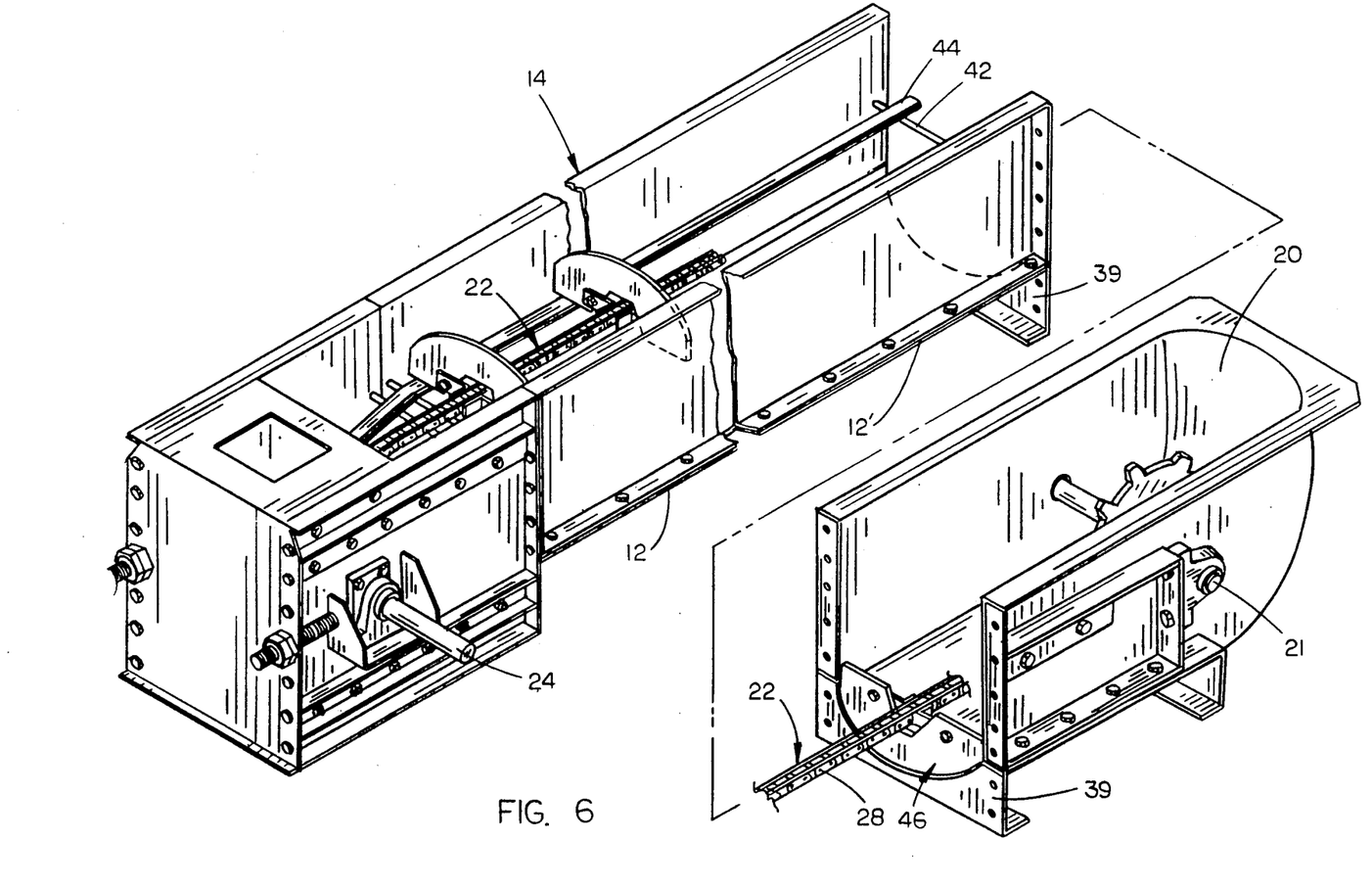
FIG. 6 is partial exploded perspective view of the conveyor of this invention.

A plurality of flat chain flights or paddles 46 are mounted on the conveyor chain means 22 as seen in the drawings. Each of the flights 46 has a rounded bottom edge 50 defining an arc which is complementary to the arc of bottom panel 30 so that the bottom edge 50 will dwell mostly adjacent the inside surface of the bottom panel 30. Each of the flights 46 is provided with upwardly extending side edges 52 and 54 which are closely positioned adjacent the inside surfaces of the lower portions of side walls 36 and 38 when in their conveying position as illustrated in FIG. 3. When the flights 46 are in their return position, the side edges 52 and 54 will be positioned closing adjacent the inside surface of the walls 36 and 38 adjacent the upper ends thereof. Top edge 56 extends between the upper ends of side edges 52 and 54 and has a cut out 58 provided thereon adapted to receive the connection for securing the flight to the chain means 22.

FIGS. 7 and 8 illustrate the preferred embodiment of the conveyor wherein the conveyor is referred to generally by the reference numeral 10'. The conveyor of FIG. 7 is identical to the conveyor of FIGS. 1-6 except that the bottom panel 30' has an arc of 90° as opposed to 120° arc illustrated in FIGS. 1-6. In FIG. 8, the chain flight 46' has a rounded bottom edge 50' defining an arc which is complimentary to the arc of bottom panel 30' so that the bottom edge 50' will dwell mostly adjacent inside surface of the bottom panel 30'.

Figure 9:
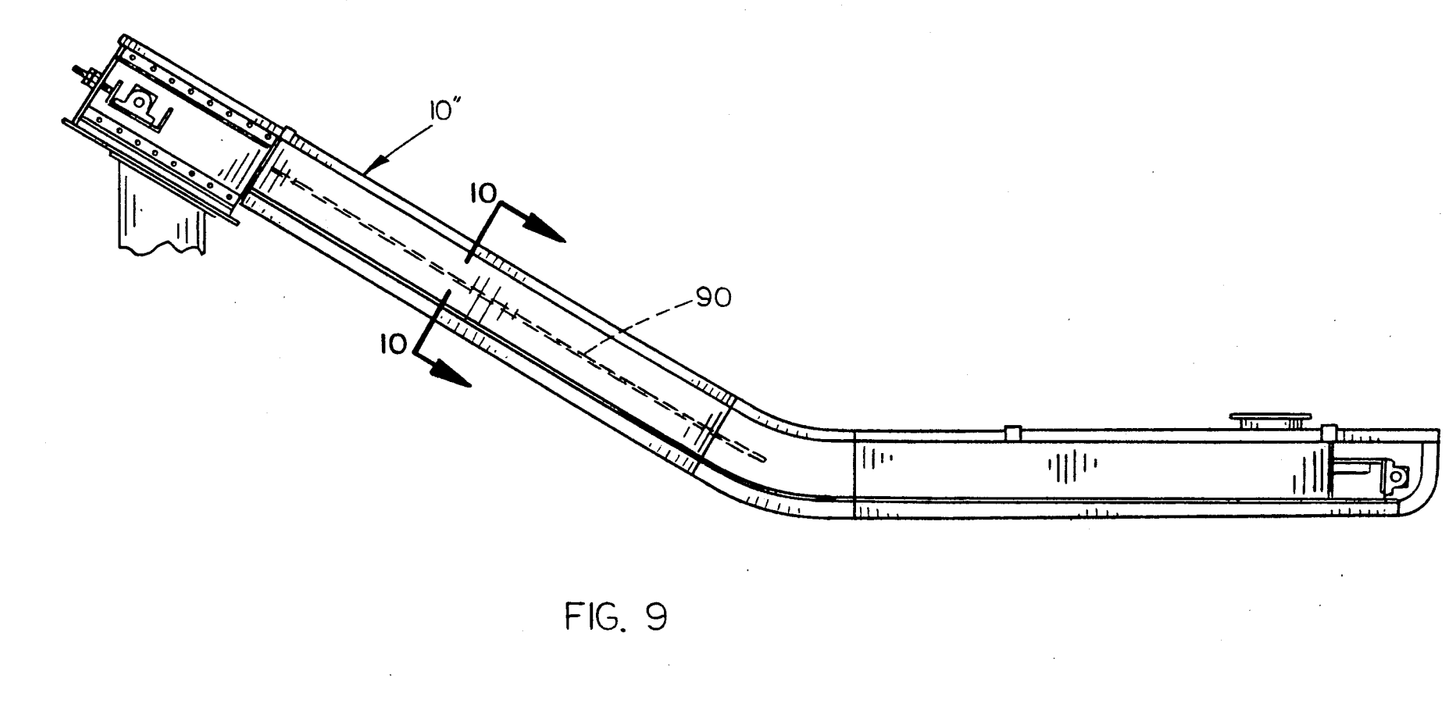
FIG. 9 is a side elevational similar to FIG. 1 except that yet a further conveyor embodiment is illustrated.
Figure 10:
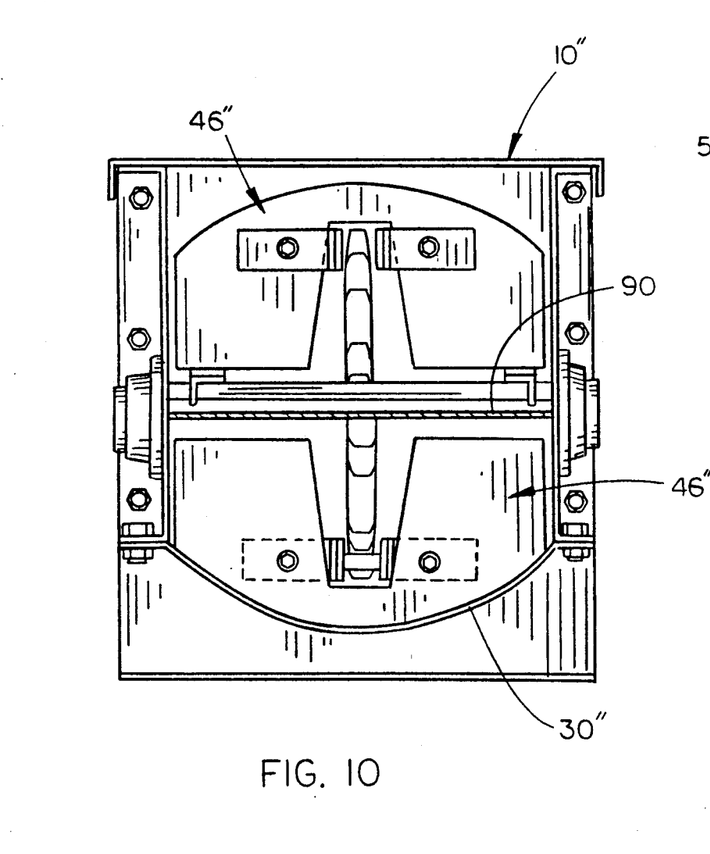
FIG. 10 is an enlarged sectional view seen on lines 10—10 of FIG. 9.
Figure 11:
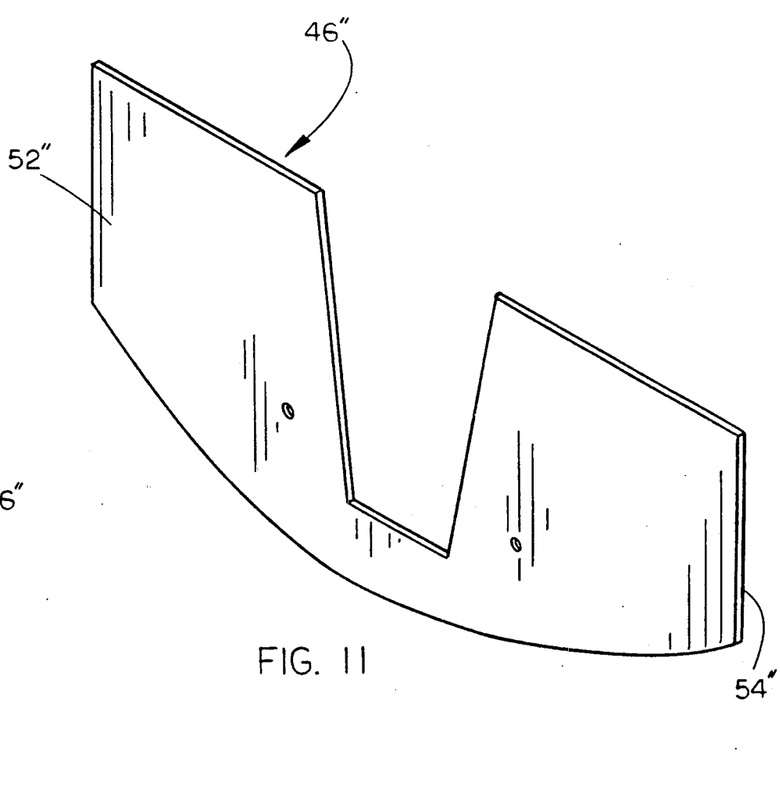
FIG. 11 is a perspective view of one of the chain flights of the conveyor of FIGS. 9 and 10.

FIGS. 9, 10 and 11 illustrate yet a further embodiment of the conveyor referred to generally by the reference numeral 10". As seen in FIG. 9, conveyor " includes an inclined portion IP which extends upwardly from the main conveyor housing. A divider pan 90 is provided in the conveyor portion IP to prevent the material being conveyed from tumbling downwardly over the tops of the chain flights 46". As seen in FIGS. 10 and 11, the side edges 52" and 54" are greater lengths than the chain flights 46 and 46'. The greater height of the chain flights 46" is provided so that the upper edges thereof will be positioned near the underside of the divider pan 90 so that the material being conveyed by the chain flights 46' will not tumble downwardly over the tops of the chain flights as the chain flights are moving upwardly in the inclined portion IP.

Figure 12:
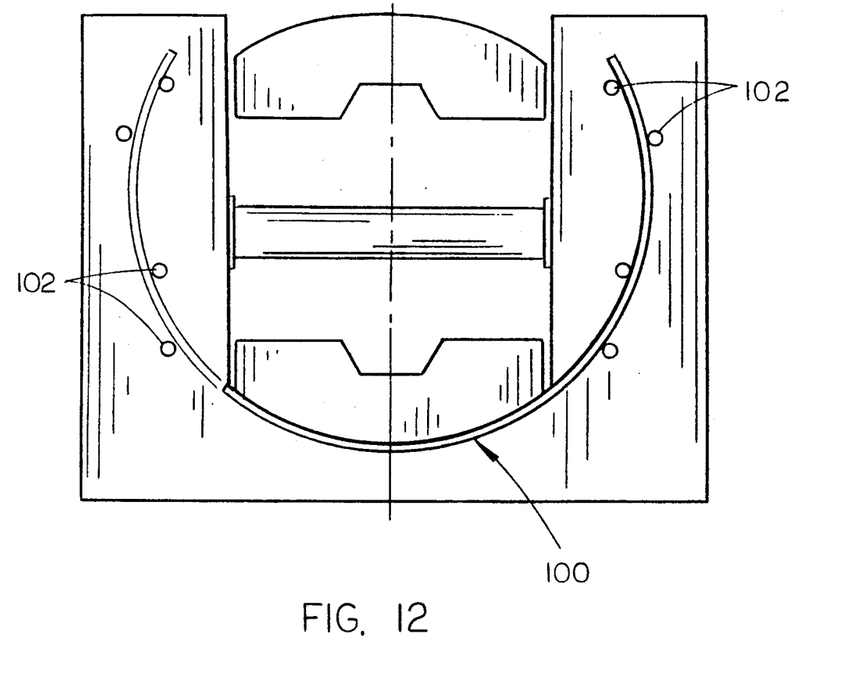
FIG. 12 is a sectional view through one of the curved-slide gates.
Figure 13:
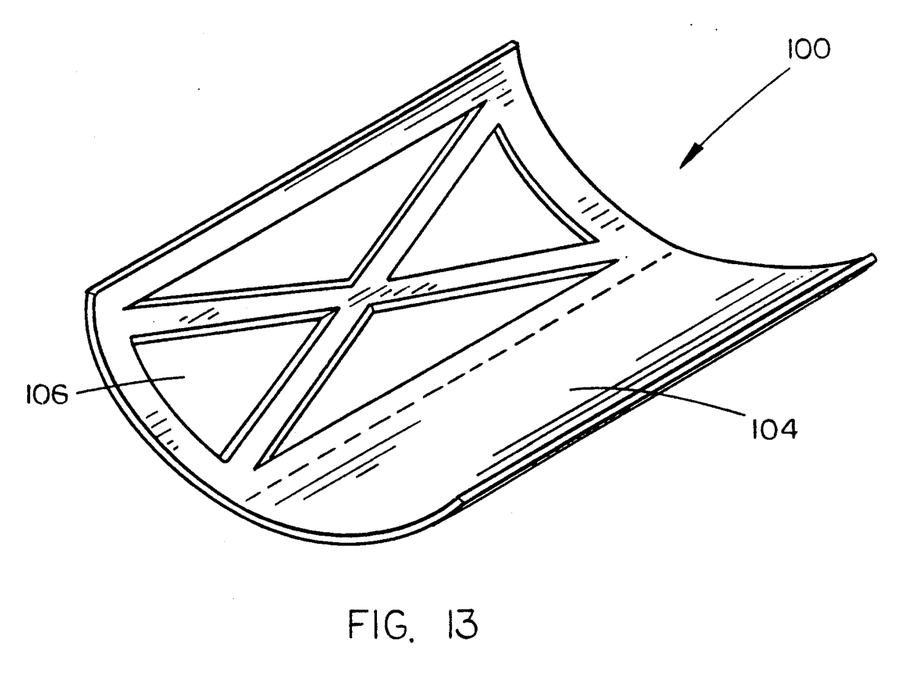
FIG. 13 is a perspective view of one of the curved-slide gates.

The conveyor of this invention is capable of large capacities in a small space similar to en-masse conveyors. The conveyor of this invention, while having the high capacity of the en-masse type conveyor, has the clean out capabilities of the round bottom type conveyor and having incline capabilities. The conveyor of this invention is built much like an en-masse conveyor with the exception of the bottom panel 30. As stated, the bottom panel 30 is a partial arc preferably covering approximately 90° as compared to the 180° arc of the typical round bottom design. The configuration of the bottom panel allows the material in the conveyor to slide into the center of the conveyor and therefore be self-cleaning while yet permitting the capacity and lining advantages described above. This partial arc design also allows a "curved-slide" type discharge gate to be designed, yielding an uninterrupted bottom surface for total clean out. One such curved-slide gate is illustrated in FIG. 12 and 13 wherein the reference numeral 100 identifies the gate supported upon a plurality of supports 102. Gate 100 includes a solid portion 104 which prevents the flow of material through the gate 100 when the gate is in its closed position. Gate 100 also includes a "web portion" 106 through which material may flow when the gate is in its open position. Gate 100 may be moved between its open and closed position by any convenient means.

Further, the bottom panel 30 may be easily replaced if it becomes worn.

The design of the conveyor flights 46 and their mounting in the housing ensures that the flights cannot "ride-up" or tilt onto the side walls of the conveyor housing since the "corners" 59 and 60 will engage the lower end of the side walls 36 and 38 respectively.

It can therefore be seen that the invention accomplishes at least all of its stated objectives.

I claim:

1. A self-cleaning en-masse conveyor, comprising,
an elongated conveyor housing having a head end and a tail end,
said housing comprising an elongated bottom having a rounded transverse cross-section which is substantially less than a semi-circle,
said bottom including outwardly extending flanges at its upper edges,
a first elongated side wall secured to the flange on one of said upper edges of said bottom and extending substantially vertically upwardly therefrom,
a second elongated side walls secured to the flange on the other of said upper edges of said bottom and extending substantially vertically upwardly therefrom,
said bottom being removably secured to said side walls,
a lid means removably mounted on the upper ends of said first and second side walls and extending therebetween,
a horizontally disposed tail shaft rotatably mounted at the tail end of said housing,
a horizontally disposed head shaft rotatably mounted at the head end of said housing,
a first sprocket mounted on said tail shaft mid-way between said side walls,
a second sprocket mounted on said head shaft midway between said side walls,
a chain means mounted on said first and second sprockets and extending therearound and therebetween to define a conveying portion and a return portion,
means for powering said head shaft,
a plurality of spaced apart, flat chain flights mounted on said chain means,
each of said chain flights having a rounded bottom edge which is complementary in shape to said rounded bottom of said housing, opposite side edges which extend substantially vertically upwardly from the opposite ends of said bottom edge, and a top edge extending between the upper ends of said side edges,
said side edges of each of said chain flights being positioned closely adjacent to the lower portion of said side walls when in their conveying attitude,
the height of said side edges being substantially less than the height of said side walls.

2. The conveyor or claim 1 wherein said bottom of said housing defines an arc of approximately 90°.

3. The conveyor of claim 1 wherein said bottom of housing defines an arc of approximately 70° to 120°.

4. The conveyor of claim 2 wherein said bottom edge of each of said flights defines an arc of approximately 90°.

5. The conveyor of claim 3 wherein said bottom edge of each of said flights defines an arc of approximately 70° to 120°.

6. The conveyor of claim 1 wherein said conveyor housing includes an inclined portion, said inclined portion of said conveyor housing having a divider pan extending between said side walls between said conveying portion and said return portion.

7. The conveyor of claim 6 wherein said bottom of said housing defines an arc of approximately 90°.

8. The conveyor of claim 6 wherein said bottom of said housing defines an arc of approximately 70°-120°.

9. The conveyor of claim 6 wherein the top edges of said chain flights, in the conveying portion of said inclined portion, are closely positioned to said divider pan.

10. The conveyor of claim 6 wherein said inclined portion is inclined up to approximately 60°.

11. The conveyor of claim 1 said housing includes at least one curved-slide gate mounted thereon.

12. The conveyor of claim 11 wherein said gate includes a solid portion and a web portion.

* * * * *